(12) United States Patent
Annambhotla

(10) Patent No.: US 10,827,368 B2
(45) Date of Patent: *Nov. 3, 2020

(54) DYNAMIC NETWORK DEVICE SELECTION FOR CONTAINERIZED APPLICATION DEPLOYMENT

(71) Applicant: Cisco Technology, Inc., San Jose, CA (US)

(72) Inventor: Srinivas Annambhotla, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/673,093

(22) Filed: Nov. 4, 2019

(65) Prior Publication Data

US 2020/0288332 A1     Sep. 10, 2020

Related U.S. Application Data

(63) Continuation of application No. 16/291,302, filed on Mar. 4, 2019, now Pat. No. 10,470,059.

(51) Int. Cl.
    *H04W 24/02*      (2009.01)
    *H04W 64/00*      (2009.01)
    (Continued)

(52) U.S. Cl.
    CPC ............ *H04W 24/02* (2013.01); *H04L 67/34* (2013.01); *H04W 64/003* (2013.01); *H04W 88/08* (2013.01)

(58) Field of Classification Search
CPC ........ A61M 2230/005; A61M 2230/10; A61M 16/0003; A61M 16/0051; A61M 16/024; A61M 2205/33; A61M 2205/3327; A61M 2205/3592; A61M 2205/502; G06F 8/61; G06F 21/44; G06F 8/60; G06F 8/38; G06F 9/54; G06F 21/31; G06F 2221/2141; G06F 3/0604; G06F 9/45558; G06F 11/362; G06F 2009/45595; G06F 11/3409; G06F 2201/815; G06F 21/6218; G06F 21/6227;
(Continued)

(56) References Cited

U.S. PATENT DOCUMENTS 10,028,213 B2    7/2018   Colban et al.
10,116,647 B2   10/2018   Maheshwari et al.
(Continued)

OTHER PUBLICATIONS

Morabito, R., et al., "Evaluating Performance of Containerized IoT Services for Clustered Devices at the Network Edge," IEEE Internet of Things Journal, Jun. 2017, 12 pages.
(Continued)

*Primary Examiner* — Nimesh Patel
(74) *Attorney, Agent, or Firm* — Meunier Carlin & Curfman LLC

(57) ABSTRACT

The present disclosure is directed to the dynamic selection and autonomous re-deployment of software-defined radio in wireless infrastructure. In some embodiments, the present disclosure is directed to a deployment manager that facilitates the dynamic selection and re-deployment of edge applications, e.g., in WAP infrastructure which the deployment are based on a pre-defined policy (e.g., Quality-of-Service (QoS), Quality of Experience policies (QoE), etc.).

20 Claims, 6 Drawing Sheets

(51) Int. Cl.
*H04L 29/08* (2006.01)
*H04W 88/08* (2009.01)

(58) Field of Classification Search
CPC ........ G06F 21/16; G06F 21/629; G06F 12/00; G06F 21/30; G06F 9/44505; G06F 9/542; G06F 3/048; G06F 9/445; G06F 21/53; G06F 21/577; G06F 21/6236; G06F 3/04817; G06F 21/86; G06F 8/30; H04L 67/02; H04L 41/145; H04L 41/5041; H04L 67/34; H04L 41/0668; H04L 41/0803; H04L 41/5054; H04L 67/10; H04L 67/125; H04L 67/2823; H04L 63/08; H04L 63/107; H04L 47/70; H04L 63/0876; H04L 63/104; H04L 63/10; H04L 63/20; H04L 63/0428; H04L 63/101; H04L 2463/082; H04L 43/08; H04L 67/1097; H04L 41/0813; H04L 41/0823; H04L 41/147; H04L 43/0876; H04L 45/028; H04L 69/18; H04L 67/306; H04L 61/0238; H04L 67/18; H04L 67/24; H04L 12/189; H04L 67/148; H04L 29/06; H04L 65/1016; H04L 67/42; H04L 12/1407; H04L 65/1073; H04L 47/14; H04L 51/38; H04L 12/4641; H04L 61/1588; H04L 65/103; H04L 65/1033; H04L 1/1812; H04L 29/12905; H04L 5/0069; H04L 67/26; H04L 65/1006; H04L 65/1069; H04L 5/006; H04L 67/1008; H04L 67/101; H04L 67/1029; H04L 67/1031; H04L 67/1038; H04L 67/22; H04L 67/303; G06Q 10/087; G06Q 30/0267; G06Q 30/0269; G06Q 10/06315; G06Q 20/1235; G06Q 50/184; H04W 28/0215; H04W 48/04; H04W 8/00; H04W 12/0053; H04W 28/065; H04W 40/248; H04W 4/14; H04W 4/70; H04W 72/04; H04W 84/04; H04W 84/18; H04W 12/0027; H04W 12/00502; H04W 12/00505; H04W 12/06; H04W 12/08; H04W 4/50; H04W 4/60; H04W 88/02; H04W 52/0251; H04W 52/0258; H04W 4/02; H04W 4/029; H04W 4/023; H04W 4/021; H04W 12/04; H04W 8/04; H04W 12/02; H04W 8/005; H04W 4/027; H04W 92/02; H04W 12/04031; H04W 4/00; H04W 28/08; H04W 36/0022; H04W 72/06; H04W 72/10; H04W 92/06; H04W 92/16; H04W 88/08; H04W 24/02; H04W 36/14; H04W 72/082; H04W 84/045; H04W 88/18; H04W 36/08; H04W 36/32; H04W 16/16; H04W 28/0226; H04W 48/20; H04W 84/12; H04W 88/16; H04W 48/18; H04W 16/10; H04W 16/18; H04W 36/16; H04W 36/30; H04W 52/243; H04W 52/245; H04W 72/0406; H04W 72/0453; H04W 72/085; H04W 12/00516; H04W 16/14; H04W 16/32; H04W 92/12; G05B 19/042; G05B 19/054; G05B 19/41835; G05B 2219/1214; C02F 2201/008; C02F 1/40; H04M 15/8038; H04M 2207/18; H04M 15/8033; H04M 7/1235; H04M 15/66; H04M 2215/32; H04M 2215/52; H04M 7/0057; H04M 15/63; H04M 15/90; H04M 2207/12; Y02D 70/142

See application file for complete search history.

(56) References Cited

U.S. PATENT DOCUMENTS

| | | | |
|---|---|---|---|
| 10,117,158 B2 | 10/2018 | De Foy et al. | |
| 2009/0271840 A1* | 10/2009 | Gillet | G06F 21/6209 726/1 |
| 2014/0019891 A1* | 1/2014 | Borah | G06F 8/30 715/762 |
| 2014/0066209 A1 | 3/2014 | Annambhotla | |
| 2016/0342801 A1* | 11/2016 | Sreekanti | G06F 21/6209 |
| 2017/0131987 A1* | 5/2017 | Chen | G06F 8/60 |
| 2018/0203995 A1* | 7/2018 | Yuen | G06F 21/556 |
| 2019/0156445 A1* | 5/2019 | Markham | G06Q 30/04 |

OTHER PUBLICATIONS

Zehl, S., et al. "ResFi: A Secure Framework for Self Organized Radio Resource Management in Residential WiFi Networks,"Technische Universitat, Telecommunication Networks Group, Dec. 2015, 34 pages.

* cited by examiner

DYNAMIC NETWORK DEVICE SELECTION FOR CONTAINERIZED APPLICATION DEPLOYMENT

TECHNICAL FIELD

Embodiments of the present invention relate to management of resources for wireless infrastructure, in particular, the dynamic selection and autonomous re-deployment of software-defined radio(s) and/or associated application(s) in wireless infrastructure.

BACKGROUND

Certain wireless infrastructure, e.g., wireless access points (WAPs), have capabilities that allows for various virtualized instances or containers of multiple radio technologies (e.g. Bluetooth, ZigBee, 3.5 GHz CBRS, 900 MHz ISM, etc.) and/or their associated application(s) to be instantiated to the wireless infrastructure following its installation in a network. As software defined radio implementations becomes more mainstream, wireless infrastructure can talk to multiple wireless technologies.

However, the versatility of the wireless infrastructure in executing more wireless radios and edge applications has many implications—including adding to the associated cost of the wireless infrastructure—in both the underutilization of deployed hardware resources and the underutilization of software licenses for such applications, among others.

BRIEF DESCRIPTION OF THE DRAWINGS

The accompanying figures, which are incorporated herein and form part of the specification, illustrate transmit power control of access point with active feedback. Together with the description, the figures further serve to explain the principles of the multi-level resource reservation described herein and thereby enable a person skilled in the pertinent art to make and use the transmit power control of access point with active feedback.

DESCRIPTION OF THE EXAMPLE EMBODIMENTS

Overview

Figure 1:
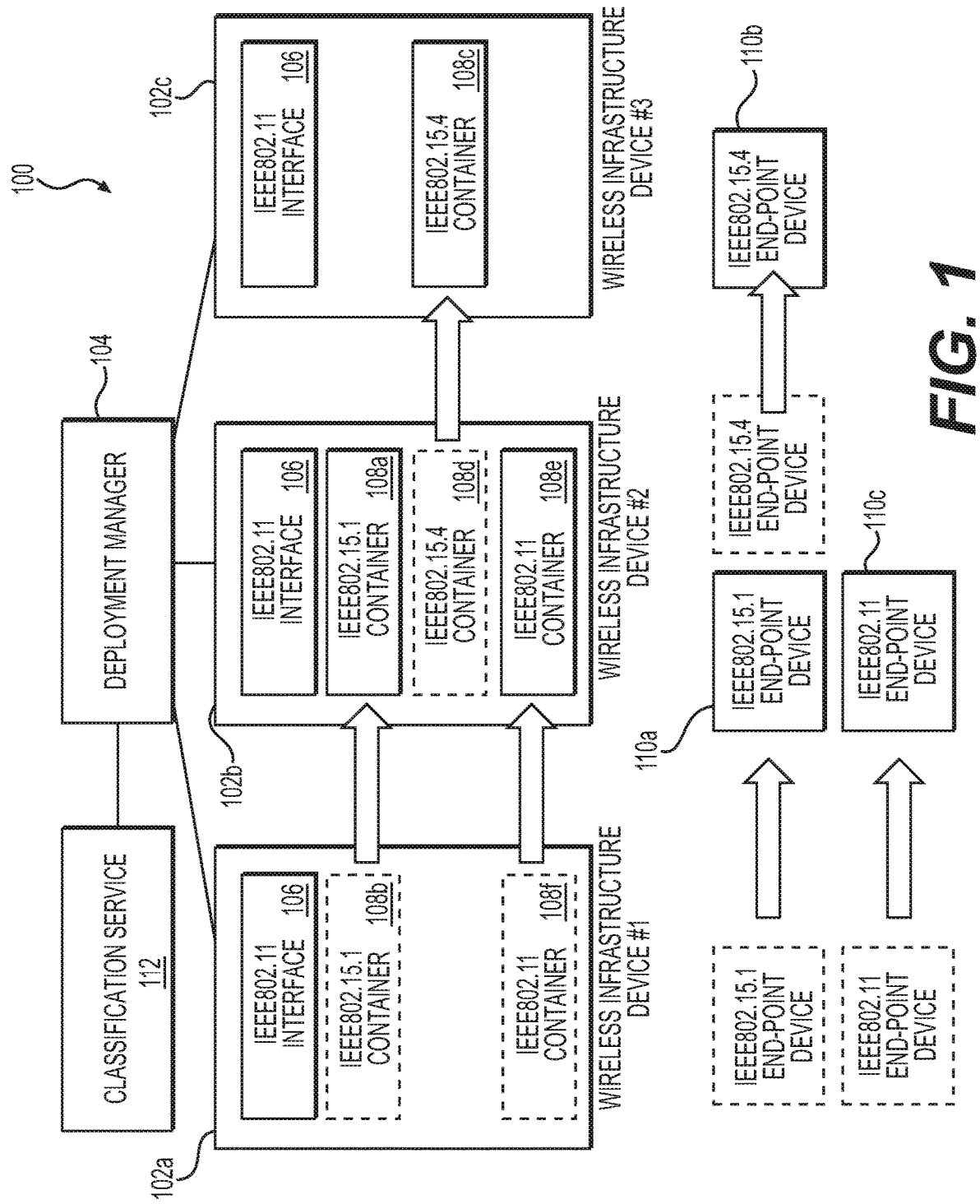
FIG. 1 is a diagram of a network in which wireless infrastructure are managed by a deployment manager, or set of managers, configured to dynamically select and autonomously deploy and redeploy software-defined radio(s) and/or associated application(s) in the wireless infrastructure, in accordance with an illustrative embodiment.

The present disclosure is directed to the dynamic selection and autonomous re-deployment of software-defined radio and/or associated application(s) in wireless infrastructure. In some embodiments, the present disclosure is directed to a deployment manager that facilitates the dynamic selection and re-deployment of edge applications, e.g., in WAP infrastructure which the deployment are based on a pre-defined policy (e.g., Quality-of-Service (QoS), Quality of Experience policies (QoE), etc.). In some embodiments, when there are multiple applications associated with a same radio type (e.g. 802.15.4) executing on a given end point device, but the associated end point applications have a different priority, the present disclosure, in some embodiments, is directed to the dynamic selection and autonomous re-deployment of application(s) associated with a software-defined radio.

In an aspect, a system (e.g., a manager, e.g., an external software controller, a manager executing on the software controller, a manager executing on an access point, e.g., network management system, network controller, or wireless LAN controller, configured to select a network device, e.g., access point (AP), switch, edge router, or other network device for containerized application deployment) is disclosed. The system includes a processor; and a memory having instructions stored thereon, wherein execution of the instructions by the processor, cause the processor to: in a network, obtain one or more end-point information (e.g., high-fidelity classification) associated with one or more end-point computing device, including a first end-point computing device (e.g., client devices, IOT devices) (e.g., wherein the one or more classification is received from a classifier service such as a device classifier service or a storage area network maintaining a database thereof or is generated via an operation executing at the network device), wherein at least one of the one or more end-point information includes an identifier associated with an end-point function of the first end-point computing device (e.g., wherein the identifier is selected from the group consisting of patient care, compliance monitoring, and lighting control) (e.g., wherein the end-point function has an associated quality-of-service value and/or an associated wireless technology protocol or gateway); receive a report (e.g., packets having MAC data, OUI data, RSSI data, protocol data, frequency of operation data, etc.) from a plurality of access points, wherein each of the plurality of access points is configured to execute at least one containerized application deployment associated with at least one radio interface (e.g., Bluetooth, ZigBee) and an associated edge computing gateway application to interface with a plurality of end-point computing devices (e.g., a class of end-point computing devices); determine a relative location value between the first end-point computing device and one or more of the plurality of access points; obtain a protocol characteristic value of the first end-point computing device from the one or more end-point information; determine a function or QOS value associated with the first end-point computing device from the one or more end-point information; select a first access point of the plurality of access points to execute a containerized application deployment of the at least one containerized application deployment, wherein the containerized application deployment comprises one or more radio interfaces and one or more associated edge computing radio applications to interface with the plurality of end-point computing devices based on i) the determined location associated with the first end-point computing device, ii) the determined function or QOS value associated with the first end-point computing device, iii) the determined protocol characteristic value of the first end-point computing device, iv) the determined location of the first access point; and direct the first access point to execute the containerized application deployment to provide access in the network for the one or more end-point computing devices.

In some embodiments, the instructions to determine the function or QOS value associated with the first end-point computing device comprises one or more instructions, wherein execution of the one or more instructions by said processor, cause the processor to retrieve, from a device classifier service (e.g., a cloud-based service), a high-fidelity classification of the first end-point computing device.

In some embodiments, the instructions to determine the relative location value associated with the first end-point computing device comprises one or more instructions, wherein execution of the one or more instructions by said processor, cause the processor to obtain RSSI information from the first end-point computing device (e.g., and from each of the plurality of end-point computing devices) and from the plurality of end-point computing devices, or a portion thereof; triangulate a location value of the first end-point computing device; determine the relative location value (e.g., a proximity value, a distance value, etc.) of the first end-point computing device to one or more of the plurality of access points based on the triangulated location value of the first end-point computing device and on the location values of the plurality of end-point computing devices, or the portion thereof.

In some embodiments, the obtained protocol attribute value set (e.g., is obtained from a database device (e.g., storage area network (SAN), a cloud-based database, a static file (e.g., XML) with the protocol attributes, a local distributed database executing on the system or the containerized application deployment manager, or a remote database server that is addressable over the Internet) comprises at least one value set selected from the group consisting of an average communication range value set, a signal power value, a multi-path signal characteristic value set, a signal attenuation characteristic value set, a data rate value set, a mesh network value set, a reliable network value set (e.g., score), and a battery cost function value set.

In some embodiments, the instructions, when executed by the processor, further cause the processor to determine (e.g., infer) a cost value for execution of the containerized application deployment at the plurality of access points, or a portion thereof, wherein the determined cost value(s) are also used to select the first access point to execute the containerized application deployment.

In some embodiments, the instructions to determine the cost value for execution of the containerized application comprises one or more instructions, wherein execution of the one or more instructions by said processor, cause the processor to retrieve, or derive, resource usage for the containerized application deployment from application requirement information obtained from an application registry or repository associated with the containerized application deployment; a published product file of the containerized application deployment (e.g., as published in the application or repository store); a manifest file of the containerized application deployment (e.g., published by an author of the APP); and a published Internet file (e.g., from a publisher of the containerized application deployment).

In some embodiments, the instructions, when executed by the processor, further cause the processor to determine a priority value for the first end-point computing device (e.g., based on QOS parameter associated with the first end-point computing device or function designated for execution on the first end-point computing device, e.g., wherein function associated with health monitoring or control is assigned a high priority value; wherein function associated with public safety is assigned a high priority value; and wherein function associated with temperature and environment control is assigned a lower priority value).

In some embodiments, the instructions to determine the priority value for the first end-point computing device employs a policy selected from the group consisting of a policy configured to provide a best-effort-delivery-guarantee-to-destination operation (e.g., an access point with a highest QoS guarantee); a policy configured to provide a best-latency-to-destination operation; a policy configured to provide a lowest-battery-usage operation; a policy configured to provide a farthest-access-point-with-service-guarantee operation (e.g., a farthest available access point device that meets a pre-defined QoS guarantee); a policy configured to provide a nearest-access-point-with-service-guarantee operation (e.g., a nearest available access point that meets a pre-defined QoS guarantee).

In some embodiments, the instructions to execute the policy configured to provide the best-effort-delivery-guarantee-to-destination operation comprises one or more instructions, wherein execution of the one or more instructions by said processor, cause the processor to determine a QoS guarantee value for each of the plurality of access points to generate a list of QoS guarantees for the plurality of access points, or a portion thereof; and select a highest, or next highest value, from the sorted list (e.g., from a list of QoS guarantee values from the determined QoS guarantee values).

In some embodiments, the instructions to execute the policy configured to provide the best-latency-to-destination operation comprises one or more instructions, wherein execution of the one or more instructions by said processor, cause the processor to determine an associated latency value each of the plurality of access points to transmit hypothetical packets, test packets, or prior packets, to a specified destination device to generate a list of associated latency values for the plurality of access points, or a portion thereof; and select a lowest, next lowest value, or best ranking score based on latency values, from the sorted list (e.g., from a list of associated latency values from the generated associated latency values).

In some embodiments, the instructions to execute the policy configured to provide the lowest-battery-usage operation comprises one or more instructions, wherein execution of the one or more instructions by said processor, cause the processor to determine an associated battery usage value to execute the function by the first end-point computing device with each of the plurality of access points, or a portion thereof, to generate a list of associated battery usage; and select (e.g., an access point having) a lowest, next lowest value, or best ranking score based on associated battery usage values from the sorted list (e.g., from a list of battery usage values generated from the determined battery usage values).

In some embodiments, the instructions to execute the policy configured to provide the farthest-access-point-with-service-guarantee operation comprises one or more instructions, wherein execution of the one or more instructions by said processor, cause the processor to determine a proximity or location value for each of the plurality of access points, or a portion thereof, that meets a minimum pre-defined QoS value to generate a list of plurality of access points; and select (e.g., an access point) a lowest, next lowest value, or best ranking score based on the proximity or location value (e.g., from a list of proximity or location values generated from the determined proximity or location value).

In some embodiments, the instructions to execute the policy configured to provide the nearest-access-point-with-service-guarantee operation comprises one or more instructions, wherein execution of the one or more instructions by said processor, cause the processor to determine a proximity or location value for each of the plurality of access points, or a portion thereof, that meets a minimum pre-defined QoS value to generate a list of plurality of access points; and select (e.g., an access point) a lowest, next lowest value, or best ranking score based on the proximity or location value.

In some embodiments, the access point is configured to execute the containerized application deployment by obtaining one or more applications (e.g., based on manifest file provided by the system or based on an access point tag assigned by the system (e.g., wherein access point tag definitions are locally stored on the access point)) from a database device (a local storage area network, a cloud-service, e.g., APP store); and executing the one or more applications (e.g., via a container manager executing thereon).

In some embodiments, the system comprises an external software controller, a manager executing on the software controller, or a manager executing on an access point.

In some embodiments, the first end-point function has an associated quality-of-service value and/or an associated wireless technology protocol or radio.

In some embodiments, the instructions, when executed by the processor, further cause the processor to obtain one or more end-point information associated with a second end-point computing device, wherein at least one of the one or more end-point information associated with the second end-point computing device includes an identifier associated with an end-point function of the second end-point computing device; determine a second relative location value between the second end-point computing device and one or more of the plurality of access points; obtain a protocol characteristic value of the second end-point computing device from the one or more end-point information; determine a function or QOS value associated with the second end-point computing device from the one or more end-point information; select a second access point of the plurality of access points to execute a containerized application deployment of the at least one containerized application deployment, wherein the containerized application deployment comprises one or more radio interfaces and one or more associated edge computing radio applications to interface with the plurality of end-point computing devices based on i) the determined location associated with the first end-point computing device, ii) the determined function or QOS value associated with the first end-point computing device, iii) the determined protocol characteristic value of the first end-point computing device, iv) the determined location of the first access point; and direct the second access point to execute the containerized application deployment to provide access in the network for the second end-point computing device.

In another aspect, a system (e.g., a wireless infrastructure, a wireless access point, or a local manager executing on the access point, to which a global manager, e.g., an external software controller, a manager executing on the software controller, a manager executing on an access point, e.g., network management system, network controller, or wireless LAN controller, can select as a network device for a containerized application deployment) is disclosed comprising a processor; and a memory having instructions stored thereon, wherein execution of the instructions by the processor, cause the processor to transmit a report having data set selected from the group consisting of MAC data, OUI data, RSSI data, protocol data, frequency of operation data, to a containerized application deployment manager (an external software controller, a manager executing on the software controller, a manager executing on an access point, e.g., network management system, network controller, or wireless LAN controller, configured to select a network device, e.g., access point (AP), or other network device for containerized application deployment); receive instructions (e.g., a manifest file) from the containerized application deployment manager to execute a containerized application deployment; and execute the containerized application deployment based on the instructions; wherein the containerized application deployment manager is configured to obtain one or more end-point information (e.g., high-fidelity classification) associated with one or more end-point computing device, including a first end-point computing device (e.g., client devices, IOT devices) (e.g., wherein the one or more classification is received from a classifier service such as a device classifier service or a storage area network maintaining a database thereof or is generated via an operation executing at the network device), wherein at least one of the one or more end-point information includes an identifier associated with an end-point function of the first end-point computing device (e.g., wherein the identifier is selected from the group consisting of patient care, compliance monitoring, lighting control) (e.g., wherein the end-point function has an associated quality-of-service value and/or an associated wireless technology protocol or radio); wherein the containerized application deployment manager is configured to determine a relative location value between the first end-point computing device and one or more of the plurality of access points; wherein the containerized application deployment manager is configured to obtain a protocol characteristic value of the first end-point computing device from the one or more end-point information; wherein the containerized application deployment manager is configured to determine a function or QOS value associated with the first end-point computing device from the one or more end-point information; and wherein the containerized application deployment manager is configured to direct the system to execute the containerized application deployment to provide access in the network for the one or more end-point computing devices.

In another aspect, a system (e.g., an end-point device, or a local manager executing on the end-point device, that executes a function through an access point at which a global manager, e.g., an external software controller, a manager executing on the software controller, a manager executing on an access point, e.g., network management system, network controller, or wireless LAN controller, can select to execute a containerized application deployment for said function) is disclosed comprising a processor; and a memory having instructions stored thereon, wherein execution of the instructions by the processor, cause the processor to transmit (e.g., broadcast) a request to join a network to a containerized application deployment manager, or to access point communicatively coupled to the containerized application deployment manager; receive instructions (e.g., a manifest file) from the containerized application deployment manager to execute the function with the first access point; and execute an application associated with the function, wherein network traffic associated with the function is at least routed to (e.g. and received from) one or more destination devices in the network through the first access point; wherein the request includes one or more parameters associated with the function selected from the group consisting of: a function description, and a QoS value associated with the function; wherein the containerized application deployment manager is configured to obtain one or more end-point information (e.g., high-fidelity classification) associated with one or more end-point computing device, including a first end-point computing device (e.g., client devices, IOT devices) (e.g., wherein the one or more classification is received from a classifier service such as a device classifier service or a storage area network maintaining a database thereof or is generated via an operation executing at the network device), wherein at least one of the one or more end-point information includes an identifier associated with an end-point function of the first end-point computing device (e.g., wherein the identifier is selected from the group consisting of patient care, compliance monitoring, lighting control) (e.g., wherein the end-point function has an associated quality-of-service value and/or an associated wireless technology protocol or radio); wherein the containerized application deployment manager is configured to determine a relative location value between the first end-point computing device and the system; wherein the containerized application deployment manager is configured to obtain a protocol characteristic value of the system from the one or more end-point information; wherein the containerized application deployment manager is configured to determine a function or QOS value associated with the system from the one or more end-point information; and wherein the containerized application deployment manager is configured to direct the first access point to execute the containerized application deployment to provide access in the network for the system.

Example Network Environment

FIG. 1 is a diagram of a network 100 in which wireless infrastructure 102 (shown as "Wireless Infrastructure #1" 102a, "Wireless Infrastructure #2" 102b, and "Wireless Infrastructure #3" 102c) are managed by a deployment manager 104, or set of managers, configured to dynamically select and autonomously deploy and redeploy software-defined radio(s) and associated applications in the wireless infrastructure, in accordance with an illustrative embodiment. As used herein, the term "associated application" refer to an edge device application associated with function or purpose of the edge device.

Wireless infrastructure, as used herein, are network devices that are configured with at least one radio and network interface 106 (shown as "IEEE802.11 Interface" 106) and includes hardware resources 108 capable of instantiating software-defined radio(s). The network interface 106, in some embodiments, are a native radio and interface of the wireless infrastructure. Examples of wireless infrastructure includes a wireless access point (WAP), a switch, an edge router, and any network device capable of being instantiated with a software-defined radio(s) and/or associated application(s) in a virtual host or a container that includes a network interface. A network interface provides connection to a network according to pre-defined standard, such as IEEE802.11a/b/g/n/ac/ax (also referred to herein as "WiFi"), IEEE802.15.1 (also referred to herein as Bluetooth), IEEE802.15.4 (also referred to herein as "ZigBee"), and etc.

A container, also referred to herein as an application container, is a standardized unit of software that include the runtime components (e.g., files, environment variables and libraries) that are necessary to run a pre-defined set of one or more software to service an intended function/application. An application container may share resources without need of a full operating system to underpin each application. In some embodiments, the application container is embodied in a software image. The application container, in some embodiments, includes a container engine that deploys these images on a set of one or more hosts. In some embodiments, containers includes a container engine that executes on the host operating system in which the container engines execute a set of one or more applications. Another type of software defined radio is a virtual machine or host that includes a hypervisor to executed on a host operating system. The hypervisor, in some embodiments, instantiates a virtual machine that includes a guest operating system and set of applications.

Referring still to FIG. 1, deployment manager 104 is a set of one or more controller(s), external software controller(s), manager(s) executing on the software controller(s), or manager(s) executing on a wireless infrastructure and is configured to select and/or guide a network infrastructure (e.g., a wireless access point or other network devices discussed herein) to execute a containerized application deployment with a software-defined radio and/or corresponding edge application(s). In some embodiments, deployment manager 104 is configured to retrieve pre-defined containerized application(s) from repositories to make available to the wireless infrastructure. In some embodiments, deployment manager 104 is configured to direct the wireless infrastructure to retrieve the pre-defined containerized application(s) from the repositories. Repositories in either instances can be internal repositories of the network or can be external repositories managed by 3rd party vendors and/or companies.

The containerized application deployment (also referred to as a containerized deployment package), in some embodiments, includes instructions for an application interface and a radio to a set of non-IP end-point devices (shown as "IEEE802.15.1 End-Point device" 110a and "IEEE802.15.4 End-Point device" 110b). In some embodiments, the containerized application deployment includes instructions for an application interface to service a given function/application for a set of one or more IP-based end-point devices (shown as "IEEE802.11 End-Point device 110c). In some embodiments, the IP-based end-point device or non-IP end-point devices are configured in a wireless mesh network (e.g., according to 802.11s, 802.15, 802.16, etc.). In some embodiments, each containerized application deployment includes a single software-defined radio and one or more applications. In some embodiments, each containerized application deployment includes a two or more software-defined radios and one or more application(s). In some embodiments, the containerized application deployment includes one or more application(s) to execute with a software-defined radio. In some embodiments, the containerized application deployment includes one or more application(s) to execute with a native device radio.

In some embodiments, deployment manager 104 is configured to select a network infrastructure to instantiate a virtual machine with a software-defined radio and corresponding edge application.

In some instances, deployment manager 104 is configured to direct one or more wireless infrastructure to each remove a software-defined radio and corresponding application associated with a containerized application deployment. In some instances, deployment manager 104 is configured to direct one or more wireless infrastructure to each add one or more containerized application deployment(s) that each includes at least one software-defined radio and at least one corresponding application. The containerized application deployment, in some embodiments, includes a pre-defined software-defined radio, a pre-defined set of interface(s), and pre-defined set of software application(s) for a given function/application. In some embodiments, deployment manager 104 is configured to direct a wireless infrastructure to execute only the pre-defined set of software application, for example, when the pre-defined software-defined radio has already been executed on the wireless infrastructure or when the wireless infrastructure includes a native radio/interface that is similar, or same, as the pre-defined software-defined radio and interface.

An edge application is an application of a networked computing device (also referred to herein as "end-point devices") in which the application is used for a distributed monitoring or distributed controls of a service by bridging, e.g., non-IP traffic in building automation, home automation, patient-care monitoring, Internet of Things applications, etc.

In FIG. 1, deployment manager 104 directs Wireless Infrastructure device #2 (102*b*) to add an IEEE802.15.1-based container and application (shown as "IEEE802.15.1 Container" 108*a*) to provide interface to an IEEE802.15.1 End-point device 110*a*, which has moved or roamed from another Wireless Infrastructure device (e.g., Wireless Infrastructure device #1 (102*a*)). Deployment manager 104 also directs Wireless Infrastructure device #1 (102*a*) to delete the IEEE802.15.1-based container and application (108*b*) executing there at.

Also, in FIG. 1, deployment manager 104 directs Wireless Infrastructure device #3 (102*c*) to also add an IEEE802.15.4-based container and application (shown as "IEEE802.15.4 Container" 108*c*) to provide interface to an IEEE802.15.4 End-point device 110*b*, which has moved or roamed from Wireless Infrastructure device #3 (102*c*) and directs Wireless Infrastructure device #2 (102*b*) to delete the IEEE802.15.4-based container and application (108*d*) executing there at. Indeed, this autonomous selection of wireless infrastructure for re-deployment and/or deployment, and the re-deployment and/or deployment of such network devices of containerized radios and applications are performed, in some embodiments, based on policies selected to be run or enforced by the deployment manager 104 and, thus, eliminates human intervention, or substantial degree of intervention, in the addition and removal of containerized application deployments for a set of end-point devices.

Though not shown in FIG. 1, deployment manager 104 may direct the addition of containerized application deployment for a new set of end-point devices being added, or installed, to the network 100. In such instances, the deployment manager 104 may determine a set of one or more wireless Infrastructure device(s) at which the containerized application deployment will be performed that optimizes the service of that end-point devices according to a user-defined policy or criteria. Alternatively, the deployment manager 104 may direct an initial set of one or more wireless infrastructure device(s) to be first deployed with containerized application(s). After which, the deployment manager 104 may continue to monitor and determine the set of one or more wireless infrastructure that would optimally run the containerized application and dynamically and autonomously re-deploy the containerized application to the optimized set of wireless infrastructure device(s).

Deployment manager 104, in some embodiments, is configured to access end-point device attributes from the end-point devices (e.g., 110*a*, 110*b*) through the network 100. Example of these end-point device attributes may include device network interface address (e.g., layer 2 information), assessed signal strength between the end-point device and an associated wireless infrastructure, supported protocol(s), operating channels and/or frequencies, required or recommended quality-of-service (QoS) operation, required or recommended latency operation, etc. In some embodiments, deployment manager 104 is configured to access end-point device attributes from an IP-based end-point devices (e.g., 110*c*), including layer 2 information (MAC address), layer 3 information (IP address(es)), assessed signal strength between the end-point device and an associated wireless infrastructure (e.g., RSSI), supported protocol(s), operating channels and/or frequencies, required or recommended quality-of-service (QoS) operation, required or recommended latency operation, etc.

Deployment manager 104, in some embodiments, is configured to access classification data associated with the end-point device from an external classification service 112. Example of an external classification service 112 includes classifier service such as a device classifier service or a storage area network maintaining a database thereof. In some embodiments, the external classification service 112 is an identity service engine that facilitates the creation and enforcement of security and access policies for end point devices connected to a campus or company's network infrastructure. In some embodiments, deployment manager 104 is configured to access classification data from static file (e.g., XML) with the protocol attributes, a local distributed database executing on the system or the containerized application deployment manager, or a remote database server that is addressable over the Internet. The classification service 112, in some embodiments, maintains databases of classification data, including, for example, but not limited to, typical range characteristics, minimum range characteristics, maximum/minimum/recommended transmission power (Tx/Rx power), multi-path characteristics, attenuation characteristics, supported data rate, indication of mesh topology, reliability and/or unreliability characteristics, battery cost function, energy use characteristics, battery life characteristics, etc.

Figure 2:
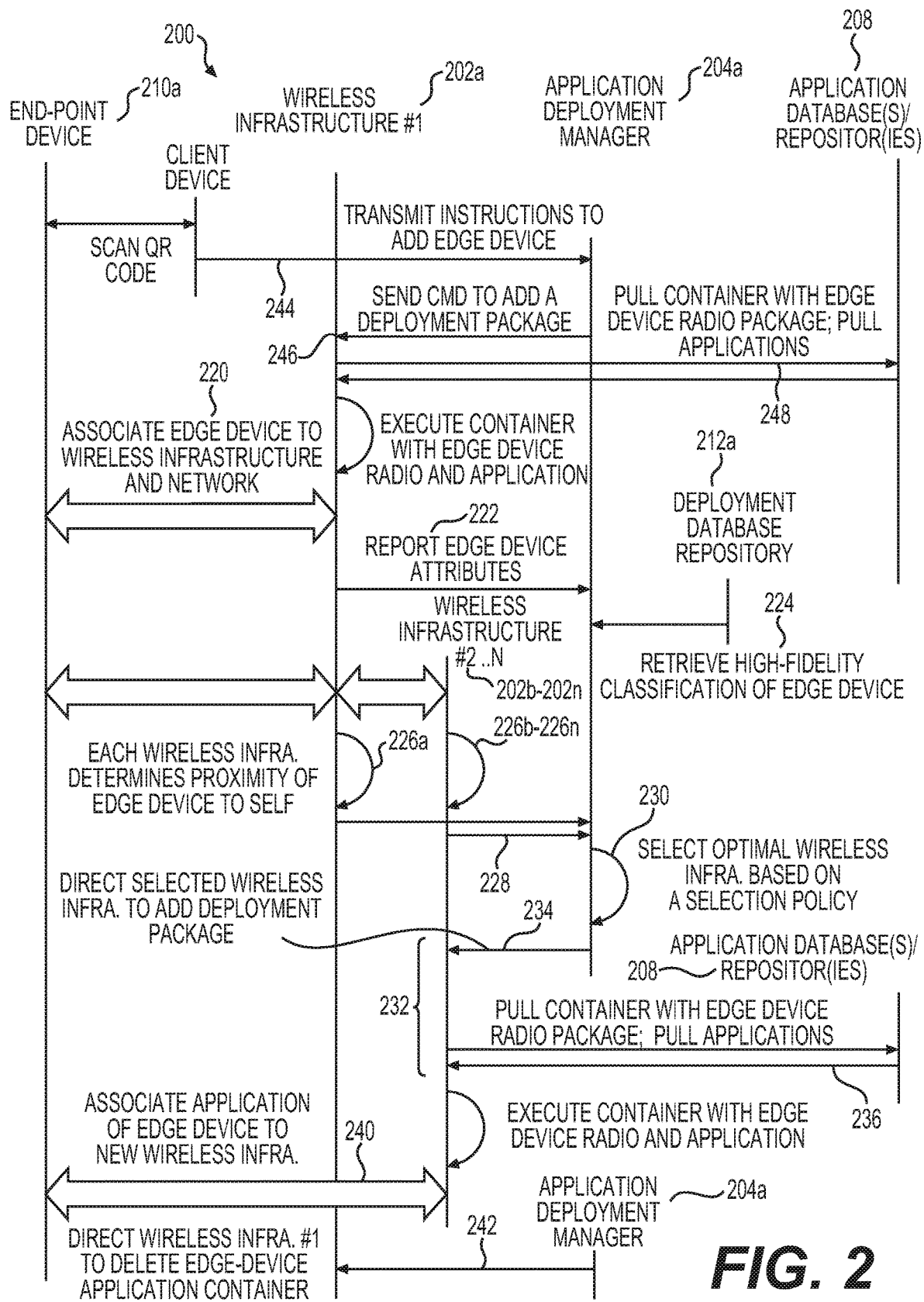
FIG. 2 is a diagram showing an example operation to dynamically select and autonomously deploy and redeploy software-defined radio(s) and/or associated application(s) in wireless infrastructure in a network, in accordance with an illustrative embodiment.

FIG. 2 is a diagram showing an example operation 200 to dynamically select and autonomously deploy and redeploy software-defined radio(s) and/or associated application(s) in wireless infrastructure in a network, in accordance with an illustrative embodiment.

The operation 200, in some embodiments, includes first having an end-point device 110 (shown as "End-point device" 210*a*) associated with the network through an initial set of wireless infrastructure (shown as "Wireless Infrastructure #1" 202*a*). In some embodiments, the end-point device (e.g., 210*a*) is associated with a client device (not shown) being used to install the end-point device (e.g., 210*a*) to the network. Subsequently, the wireless infrastructure (e.g., 202*a*), or client device (not shown), can retrieve information from the end-point device (e.g., 210*a*) and relay the information to the deployment manager 104 (shown as "Application Deployment Manager" 204a). The deployment manager (e.g., 204a) may access classification information associated with the end-point device (e.g., 210a) and use all, or a subset, of the accumulated data to infer the function of the end-point device (e.g., 210a) and the communication/ execution requirement and cost to execute an associated containerized application deployment at a given wireless infrastructure (e.g., 202a, 202b-202n). The deployment manager (e.g., 204a) may then select an optimized set of one or more wireless infrastructure (e.g., one or more of 202a, 202b-202n) according to one of pre-defined policies as discussed herein to service the end-point device or sets thereof. The policy may be made based on proximity, quality-of-service requirement, and/or latency requirement of the end-point application Based on the selection, the deployment manager may guide or direct the re-deployment of the containerized applications autonomously, or nearly autonomously, with little or no human intervention.

As shown in FIG. 2, the operation 200 includes having an end-point device 210a associated (step 220) with the network through an initial set of wireless infrastructure (shown as "Wireless infrastructure #1" (202a)). In some embodiments, the operation (220) also includes authentication and other steps to make the end-point device 210a accessible to the network, and vice versa, or at least to the wireless infrastructure 202a. From the association operation, or a subsequent authentication or reporting operation, the wireless infrastructure 202a has a set of end-point attributes associated with end-point device 210a. For non-WiFi-based end-point devices, the attributes includes, for example, but not limited to, device network interface address (e.g., layer 2 information) associated with the device radio, device description, manufacturer code, assessed signal strength between the end-point device 210a and the wireless infrastructure 202a, supported protocol(s), operating channels and/or frequencies, required or recommended quality-of-service (QoS) operation, required or recommended latency operation, etc. For WiFi/IP-based end-point devices, the attributes includes, for example, but not limited to, MAC address (layer 2 information) associated with the device radio, IP address(es) (layer 3 information), device description, manufacturer code, assessed signal strength (e.g., RSSI) between the end-point device 210a and the wireless infrastructure 202a, supported protocol(s), operating channels and/or frequencies, required or recommended quality-of-service (QoS) operation, required or recommended latency operation, etc.

The wireless infrastructure 202a reports (step 222) the attributes to the deployment manager 204a. The deployment manager 204a retrieves (step 224) high-fidelity classification information associated with the end-point device 210a from a classification service 112 (shown as "Deployment Database Repository" 212a). In some embodiments, the deployment database repository 212a is an external device classifier service that maintains a repository of classification information. In some embodiments, the deployment database repository 212a is a storage area network maintaining a database of classification information. In some embodiments, the deployment database repository 212a is a networked storage device to which classification information for sets of end-point devices are maintained for a given network/campus. In some embodiments, the deployment database repository 212a is a static file (e.g., XML) with the protocol attributes. In some embodiments, the deployment database repository 212a is a local distributed database executing on a system or the containerized application deployment manager. In some embodiments, the deployment database repository 212a is a remote database server that is addressable over the Internet.

From the high-fidelity classification information and/or the end-point attributes, it can be inferred of the function or purpose of the end-point device, which can be used to establish a deployment policy for the end-point device. For example, end-point device with high QoS requirements (e.g., video and audio devices), as can be ascertained from the classification information, may be assigned a deployment policy that provides a nearest wireless infrastructure with latency guarantees. End-point device with medical-related monitoring maybe assigned a deployment policy that provides a nearest wireless infrastructure with QoS guarantees or that provides a best effort delivery to destination guarantees. Home automation devices and smart thermostats/sensors may be assigned a deployment policy that provides for the lowest battery operation (if they have batteries) or that provides a best effort delivery to destination guarantees (having lowest priority than medical related devices) or a farthest wireless infrastructure with service guarantees. Other classification can be used. In some embodiments, the deployment manager 204a retrieves a deployment policy for a given set of end-point device(s) based on the device attributes.

Referring still to FIG. 2, the deployment manager 204a (e.g., when enforcing policies based on QoS, latencies) determines the proximity, or relative proximity, between the end-point device 210a and set of accessible wireless infrastructure in the network (e.g., from a set of accessible 202a and 202b-202n). In the embodiment shown in FIG. 2, the wireless infrastructure (e.g., subsets of 202a and 202b-202n) determines (226a, 226b-226n) the proximity, or relative proximity, values from measurement of the power present in a received radio signal between the end-point device 210a and itself and transmits (228) that information to the deployment manager 204a. The deployment manager 204a, in some embodiments, aggregates the received proximity, or relative proximity, values to establish a proximity ranking among the wireless infrastructure.

In some embodiments, rather than the wireless infrastructure determining the proximity, or relative proximity, with the end-point device, the deployment manager 204a is configured to use signal strength information (e.g., RSSI) to compute location, or relative location, of the end-point device 210a to the wireless infrastructure (e.g., 202a-202b-202n). In some embodiments, the computed location, or relative location, of the end-point device 210a is estimated based on a triangulation operation, or the like surveying algorithms.

Referring still to FIG. 2, the deployment manager 204a then selects (230) and autonomously deploy and redeploy (232) software-defined radio(s) and application to the selected wireless infrastructure.

The selection process (230), in some embodiments, is based on the attributes and classification of the end-point devices. For example, for mesh-network application, the selection process (230) includes selecting a set of wireless infrastructure to form a mesh and selecting specific wireless infrastructure that best meets the deployment policy. For medical-related monitoring, which is expected to be located across a wide area, the selection process (230) may include selecting a set of wireless infrastructure that full covers the geographic area and prioritizing specific wireless infrastructure that best meets the deployment policy. For building automation and thermostat applications that are expected to be static, the selection process (230) may include selecting a set of wireless infrastructure that best provides coverage while not affecting other higher priority applications, such as medical monitoring.

In some embodiments, the priority for the end-point devices can be based on a policy configured to provide a best-effort-delivery-guarantee-to-destination operation (e.g., an access point with a highest QoS guarantee); a policy configured to provide a best-latency-to-destination operation; a policy configured to provide a lowest-battery-usage operation; a policy configured to provide a farthest-access-point-with-service-guarantee operation (e.g., a farthest available access point device that meets a pre-defined QoS guarantee); or a policy configured to provide a nearest-access-point-with-service-guarantee operation (e.g., a nearest available access point that meets a pre-defined QoS guarantee).

In some embodiments, the best-effort-delivery-guarantee-to-destination operation includes determining a QoS guarantee value for each of the plurality of access points to generate a list of QoS guarantees for the plurality of access points, or a portion thereof; and selecting a highest, or next highest value, from the sorted list (e.g., from a list of QoS guarantee values from the determined QoS guarantee values).

In some embodiments, the best-latency-to-destination operation includes determining an associated latency value each of the plurality of access points to transmit hypothetical packets, test packets, or prior packets, to a specified destination device to generate a list of associated latency values for the plurality of access points, or a portion thereof; and selecting a lowest, next lowest value, or best ranking score based on latency values, from the sorted list (e.g., from a list of associated latency values from the generated associated latency values).

In some embodiments, the lowest-battery-usage operation includes determining an associated battery usage value to execute the function by the first end-point computing device with each of the plurality of access points, or a portion thereof, to generate a list of associated battery usage; and selecting (e.g., an access point having) a lowest, next lowest value, or best ranking score based on associated battery usage values from the sorted list (e.g., from a list of battery usage values generated from the determined battery usage values).

In some embodiments, the farthest-access-point-with-service-guarantee operation includes determining a proximity or location value for each of the plurality of access points, or a portion thereof, that meets a minimum pre-defined QoS value to generate a list of plurality of access points; and selecting (e.g., an access point) a lowest, next lowest value, or best ranking score based on the proximity or location value (e.g., from a list of proximity or location values generated from the determined proximity or location value).

In some embodiments, the nearest-access-point-with-service-guarantee operation includes determining a proximity or location value for each of the plurality of access points, or a portion thereof, that meets a minimum pre-defined QoS value to generate a list of plurality of access points; and selecting (e.g., an access point) a lowest, next lowest value, or best ranking score based on the proximity or location value.

In some embodiments, deployment manager 204a is configured to determine (e.g., infer) a cost value for execution of the containerized application deployment at the plurality of access points, or a portion thereof, wherein the determined cost value(s) are also used to select the first access point to execute the containerized application deployment. The selection process (230) can consider communication requirement (e.g., distance of communication, data rates, frequency of operation, other associated communication characteristics), business context and requirements (e.g., logistics drone may be assigned higher priority than a wireless light bulb).

Indeed, the deployment policy can enhance CPU utilization to avoid containerized application being deployed on all network infrastructure, which could cause adverse impacts to the main function of the wireless infrastructure in serving WiFi clients. The deployment policy can also reduce the consumption of application licenses, if applicable. The deployment policy may consolidate communication requirements by the network where the end-point device are IoT SoCs with multi-protocol and radios. The deployment policy may reduce communication requirement on the network where the use case is confined to a specific location (e.g., HVAC/thermostat controls). The deployment policy may address changes in end-point device location with time.

In an embodiment as shown in FIG. 2, the deployment manager 204a may guide (232) the autonomously deployment and redeployment (232) software-defined radio(s) and application to the selected wireless infrastructure by directing and tracking (step 234) the selected set of wireless infrastructure to pull (step 236) appropriate containerized deployment packages from designated application database(s) and repositor(ies) (208) and to direct the execution (step 238) of such containers at the selected wireless infrastructure. Following association (shown as 240) of the end-point device 210a to the new selected wireless infrastructure, the deployment manager 204a then directs (step 242) the initial set of wireless infrastructure, or non-selected wireless infrastructure, to suspend and delete appropriate application container(s) to free up resource on such devices.

In some embodiments, deployment manager 204a is configured to transmit notification to the user (i.e., network administrator) of log entry in changes in deployment. In other embodiments, the deployment manager 204a is configured to send a request to the user to accept a proposed change to the deployment/re-deployment of containerized application prior to executing on such commands. It is noted that in such instances, deployment manager 204a still guides the autonomous deployment and redeployment of software-defined radio(s) and application as the multiple actions required to perform such tasks are automated and are performed without subsequent human intervention.

In some embodiments, rather than directing the wireless infrastructure to pull appropriate containerized deployment packages from designated application database(s) and repositor(ies), deployment manager 204a is configured to pull the appropriate containerized deployment package(s) from designated application database(s) and repositor(ies) and to push, or direct the appropriate wireless infrastructure to pull, the retrieved containerized deployment packages to the appropriate wireless infrastructure.

Referring still to FIG. 2, as discussed above, the example begins with the end-point device 210a having already associated with the network through the initial set of wireless infrastructure 202a. In some embodiments, the association may be initiated from the client device or from the deployment manager 204a.

As shown in FIG. 2, in some embodiments, the end-point device 210a is initially added manually, e.g., through a remote terminal, by the user directing (step 244) the deployment manager 204a to direct (step 246) a set of initial wireless infrastructure (e.g., 202a) to execute the containerized deployment package. In some embodiments, deployment manager 204a pulls (see, e.g., FIGS. 4-6) the appropriate containerized deployment package(s) from designated application database(s) and repositor(ies) (208) and push the package to the set of initial wireless infrastructure. In other embodiments, deployment manager 204a directs (step 248) the set of initial wireless infrastructure 202a to pull the containerized deployment packages from the designated application database(s) and repositor(ies) (208).

Figure 3:
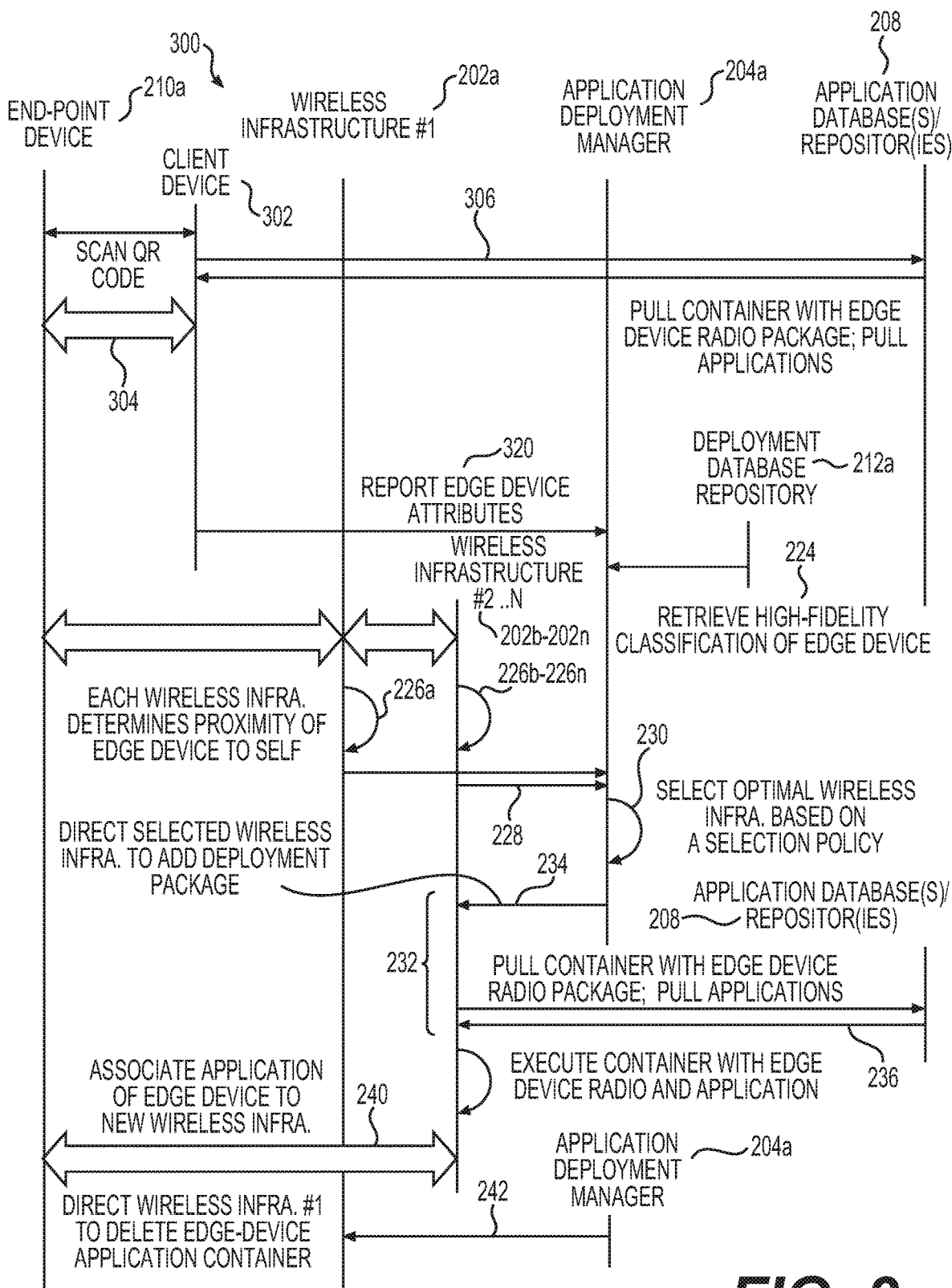
FIG. 3 is a diagram showing another example operation to dynamically select and autonomously deploy and redeploy software-defined radio(s) and/or associated application(s) in wireless infrastructure in a network, in accordance with an illustrative embodiment.

In some embodiments, the association may be initiated from a client device. FIG. 3 is a diagram showing another example operation 300 to dynamically select and autonomously deploy and redeploy software-defined radio(s) and/or associated application(s) in wireless infrastructure in a network, in accordance with an illustrative embodiment. In FIG. 3, a client device 302 is first associated (304) with the end-point device 210a. For example, the client device 302 may retrieve (step 306) a containerized package from a designated application database(s) and repositor(ies). In some embodiments, the retrieval (306) may be based on a QR scan. In other embodiments, the containerized package is selected by the user to be added to, and installed at, the client device 302. To this end, the client device 302 may retrieve (step 308) the edge device attributes from the end-point device 210a and provide (step 310) that information to the deployment manager 204a as a trigger, or command, to initiate the dynamic selection and autonomously deployment and redeployment of software-defined radio(s) and/or associated application(s) in wireless infrastructure (e.g., 202b-202n) in a network, e.g., as described in relation to FIG. 2.

In other embodiments, the end-point is initially added to the network by roaming from another network accessible to the instant network. FIG. 2 shows the end-point being initially being added manually by a user. In FIG. 2, the user, through a client device, transmit instructions to add the end-point device to the network. In some embodiments, the client device is executing a device manager application that facilitates the adding of end-point device(s) to a network. In other embodiments, the client device is executing a portal that facilitates the adding of end-point device(s) to the network. In some embodiments, information about the end-point device is accessed by the client device via use of QR codes. In other embodiments, the user may retrieve information associated with the end-point device through a search performed based on make and/or model of the end-point device.

Network Management Device

Figure 4:
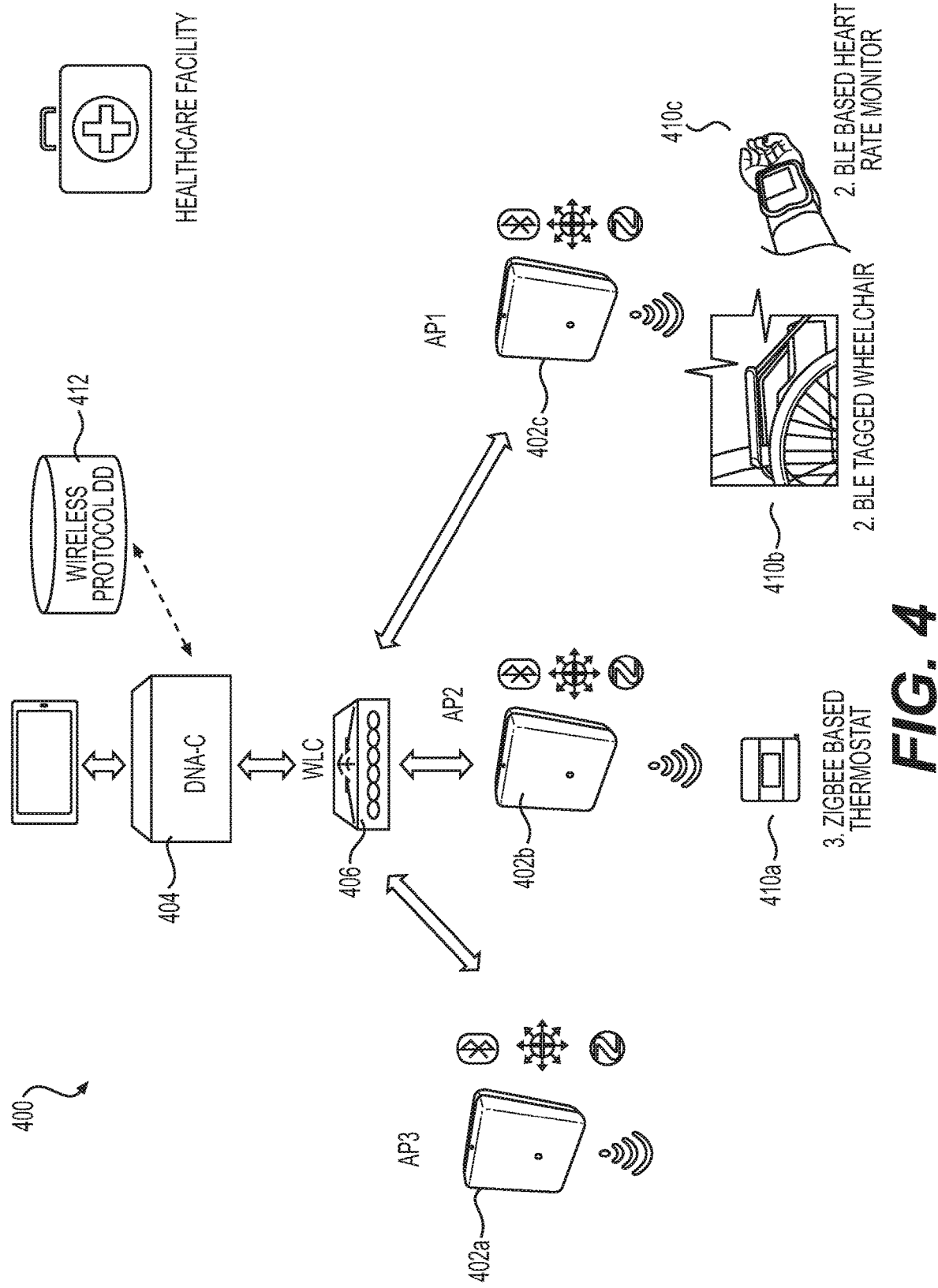
FIG. 4 is a diagram of a network that includes a network management device (as an example of an external controller that is a deployment manager) that manages the dynamic selection and autonomous deploy and redeploy software-defined radio(s) and/or associated application(s) in wireless infrastructure, in accordance with an illustrative embodiment.

FIG. 4 is a diagram of a network 400 that includes a network management device 404 (as an example of an external controller that is a deployment manager 104) that manages the dynamic selection and autonomous deploy and redeploy software-defined radio(s) and/or application(s) in wireless infrastructure, in accordance with an illustrative embodiment. The network management device 404, in some embodiments, is Cisco Digital Network Architecture Center (DNA-C), manufactured by Cisco Technology, Inc (San Jose, Calif.). The Digital Network Architecture Center, in some embodiments, is an open, software-driven approach that receives streaming telemetry data from devices (e.g., switch, router, access point, and wireless access controller) in a network.

In FIG. 4, the network management device 404 operates with a wireless LAN controller 406 and classification service 112 (shown as "Wireless Protocol DB" 412). The wireless LAN controller 406 is configured to manage a set of wireless infrastructure 102 (shown as wireless access points 402a, 402b, and 402c). In some embodiments, the wireless LAN controller 406 is part of Cisco Unified Wireless Network (CUWN) solution, which helps make it easier to manage such large scale deployments and assumes a central role in the CUWN. Traditional roles of access points, such as association or authentication of wireless clients, are done by the wireless LAN controller. Access points, such as Lightweight Access Points (LAPs) in the unified environment, may register themselves with a wireless LAN controller and tunnel all the management and data packets to the wireless LAN controllers, which then switch the packets between wireless clients and the wired portion of the network. All the configurations may be done on the wireless LAN controller, and the lightweight access points download the entire configuration from wireless LAN controller and act as a wireless interface to the clients. In some embodiments, there may not be a wireless LAN controller and data packets are routed from access points directed to other network nodes, e.g., via cloud-tethered access points.

In some embodiments, the lightweight access points use the IETF standard Control and Provisioning of Wireless Access Points protocol (CAPWAP) to communicate between the wireless LAN controller and other lightweight access points on the network. CAPWAP, which is based on LWAPP, is a standard, interoperable protocol that enables a controller to manage a collection of wireless access points.

Referring still to FIG. 4, the network management device 404 manages, among other things, the deployment and re-deployment of the containerized application for the set of wireless access points 402a, 402b, and 402c in providing functions, e.g., for a Zigbee-based thermostat 410a, a Bluetooth low energy (BLE) tagged wheelchair (410b), and a BLE-based heart rate monitor (410c). The wireless access points 402a, 402b, and 402 are each configurable to deploy a software-defined Bluetooth radio, a software-defined Zigbee radio, a software-defined EnOcean radio, a software-defined Bluetooth low energy (BLE) radio, a software-defined 6LoWPAN radio, a software-defined DASH7 radio, a software-defined wireless USB radio, etc.

Rather than a "deploy on all" or "deploy manually" approach in which each can result in sub-par or underperforming network configurations, the network management device 404 is configured to measure, evaluate, and then act to select and autonomously deploy and de-deploy containerized applications (or other like software-defined interface and applications).

In a measurement stage, the network management device 404 is configured to identify, in some embodiments: end point device(s) of interest; wireless technology of interest associated with the end point device(s) and the behavior of these end point devices; associated end-point device function(s) (e.g. for patient care, compliance monitoring, lighting control, etc.); potential priority of the specific end point device(s), e.g., based on information and/or context of the business outcome which may have been explicitly provided in the end-point device or could be deduced by the network management device, e.g., by triaging multiple information from pre-defined systems and/or databases (e.g. example of such information include device classification, applications being utilized, cost of the end point etc.); number of wireless access points in proximity to the end point devices of interest and/or associated information relating to the resource utilization or resource availability of these wireless access points; application profile (e.g., function, resource requirements, etc.) for each of the applications or functions of the end point devices of interest; location, or proximity of, the wireless access points and the end point devices of interest.

In an evaluation stage, the network management device 404 is configured to resolve the multiple pieces of collected information (e.g., the measurement stage) and to tag selected wireless access point, or like network infrastructure, in the vicinity or proximity of the end point devices as best suited to handle specific applications and the associated end points/ devices according to a pre-defined deployment policy. In the action stage, the network management device 404 is configured, in some embodiments, based on the tagging of the wireless access points in the evaluation stage, to autonomously deploy containerized applications (container-based or otherwise) on the selected wireless access points with the appropriate tags. In some embodiments, the network management device 404 is configured to present, or direct the presentation, e.g., in a graphical user interface, of the tagged wireless access points and corresponding applications for the user to approve such deployment configuration. In some embodiments, the network management device 404 may additionally present, or direct the presentation of, the location of the tagged wireless access points and allow the user to re-select the wireless access points. Indeed, the presented tagged wireless access points can serve as a guideline in the configuration of the network to which the user/network administrator has full control to administer and manage.

Referring back to FIG. 4, a use case is provided. The network in this use-case comprises a healthcare facility with wireless infrastructure deployment and end point devices in which there are two different BLE (Bluetooth low energy) devices (e.g., a patient heart rate monitor and a tagged wheelchair) and a ZigBee-based thermostat, each of which are located within the vicinity of a set of wireless access point #1, #2, and #3 (shown as 402a, 402b, and 402c). In this use-case, the BLE-based heart rate monitoring device 410c and its associated edge computing application communicate and alert, in near real-time, a client device held by a nearby nurse while the edge application monitoring the geofence of a tagged wheelchair 410b may alert a client device held by a hospital housekeeping staff. Further, the ZigBee-based thermostat 410a may communicate with a building management system monitored by the hospital facilities staff. In this use-case, a "deploy on all" approach is not an option as there are multiple devices with disparate applications contending for resources of a nearest wireless access points and lacks an objective assessment of the most appropriate wireless access points to deploy each of the applications.

Figure 5:
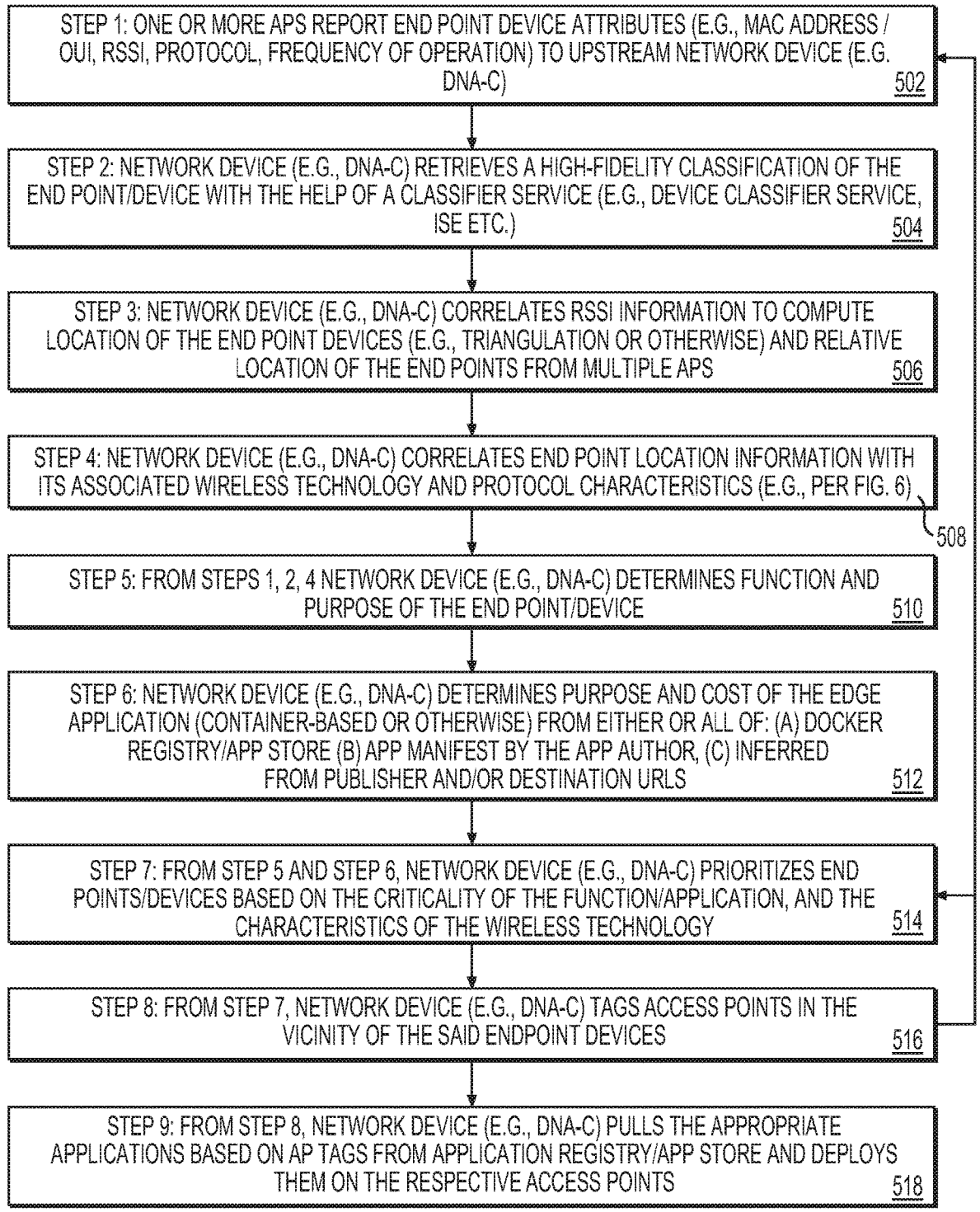
FIG. 5 is a diagram of example operation of the network management device and wireless infrastructure of FIG. 4 is dynamically selecting and autonomously deploying and de-deploying software-defined radio(s) and/or associated application(s) in the wireless infrastructure, in accordance with an illustrative embodiment.

FIG. 5 is a diagram of example operation of the network management device 404 and wireless infrastructure of FIG. 4 is dynamically selecting and autonomously deploying and de-deploying software-defined radio(s) and/or associated application(s) in the wireless infrastructure, in accordance with an illustrative embodiment.

As shown in FIG. 5, step 502 (also referred to as "Step 1") of the method 500 includes one or more wireless access point(s) reporting end point device attributes to an upstream network management device 404. The reported attributes, in some embodiments, includes MAC address and/or organizationally unique identifier (OUI), received signal strength indicator (RSSI), supported protocol, frequency of operation, etc. In some embodiments, the organizationally unique identifier (OUI) is a 24-bit number that uniquely identifies a vendor, manufacturer, or other organization. The MAC address of a device is a unique identifier assigned to a network interface controller (NIC) for communications at the data link layer of a network segment. MAC addresses are used as a network address for most IEEE 802 network technologies, including Ethernet, Wi-Fi and Bluetooth.

Referring still to FIG. 5, step 504 (also referred to as "Step 2) of the method 500 includes the network management device 404 retrieving a high-fidelity classification of the end point device from a classifier service. Example of classifier service that can be used includes Device Classifier Service and Cisco's Identity Service Engine (ISE), and the like. Cisco Identity Services Engine (ISE) is a network administration product that enables the creation and enforcement of security and access policies for endpoint devices connected to the company's routers and switches. The purpose is to simplify identity management across diverse devices and applications.

Referring still to FIG. 5, step 506 (also referred to as "Step 3") includes the network management device 404 correlating location information (e.g., RSSI information) to relative locations of the end points to the multiple wireless access points. In some embodiments, the network management device 404 compute locations of the end points/devices (e.g., via triangulation operation, or otherwise).

Figure 6:
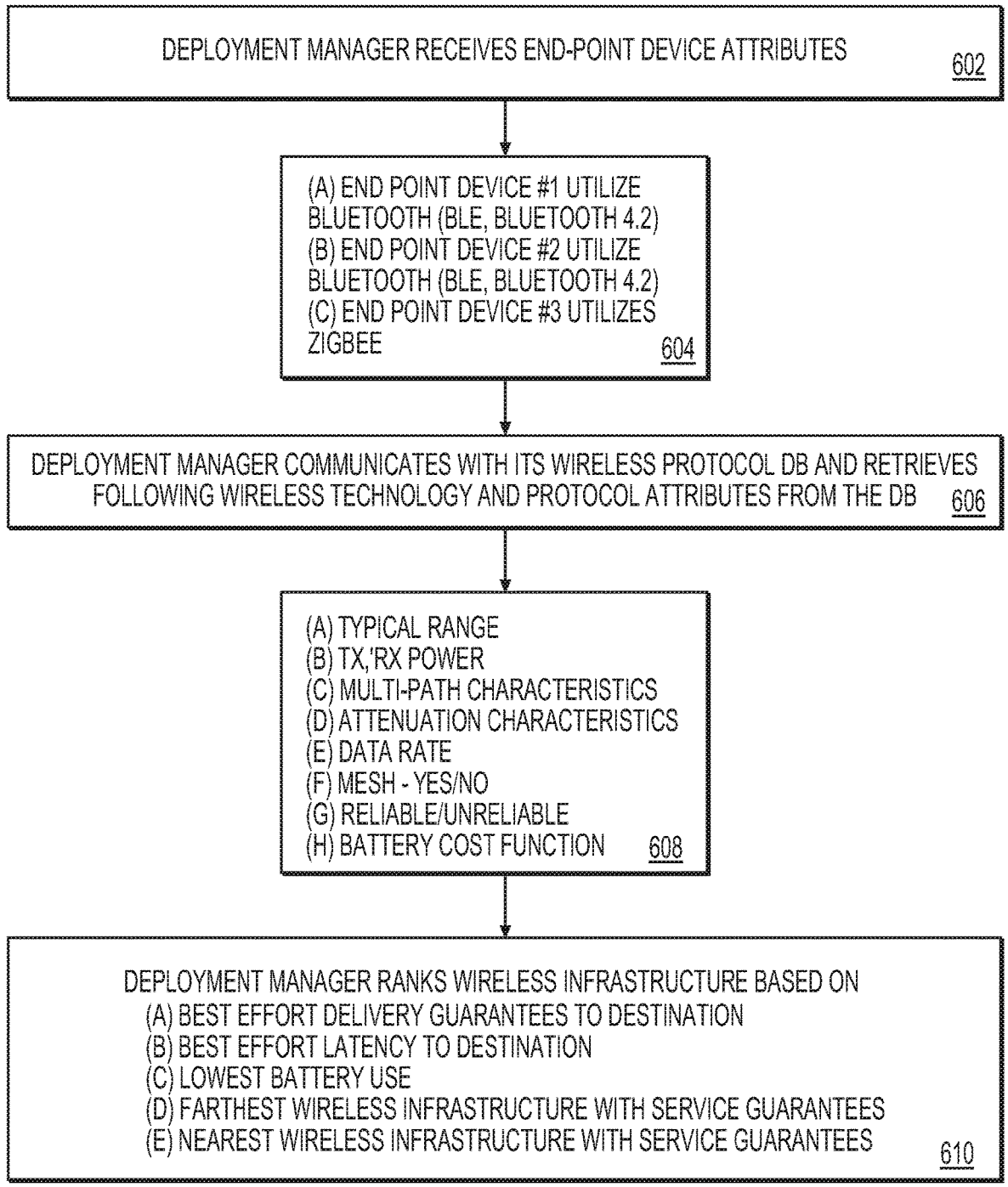
FIG. 6 is a diagram of example operation of the network management device in correlating end point location information with its associated wireless technology and protocol characteristics as discussed in relation to FIG. 5, in accordance with an illustrative embodiment.

Referring still to FIG. 5, step 508 (also referred to as "Step 4) includes the network management device 404 correlating end point location information with its associated wireless technology and protocol characteristics. FIG. 6 is a diagram of example operation of the network management device 404 in correlating end point location information with its associated wireless technology and protocol characteristics as discussed in relation to FIG. 5, in accordance with an illustrative embodiment. As shown in FIG. 6, the network management device 404 receives (see block 602) end-point attributes, including that end-point devices #1 utilize Bluetooth (BLE, Bluetooth 4.2), that end-point devices #2 utilize Bluetooth (BLE, Bluetooth 4.2), and End Point/ device 3 utilizes ZigBee (see block 604).

The network management device 404 then communicates (see block 606) with a wireless protocol DB to retrieves wireless technology and protocol attributes from the database. In some embodiments, the received wireless technology and protocol attributes includes (a) typical range information associated with the end-point device or class thereof, typically transmission and reception power, multi-path characteristics, attenuation characteristics, supported and typical data rate, supported mesh configuration, reliability and unreliable information, and battery cost function.

The network management device 404, in some embodiments, is configured to rank the end point devices based on wireless protocols/tech by optimizing for one of a set of available policies—(a) best effort delivery guarantees to destination, (b) best effort latency to destination, (c) lowest battery function, (d) farthest access point with service guarantees, and (e) nearest access point with service guarantee.

In some embodiments, the policy is manually selected by the user. In some embodiments, the policies are mapped to specific set of end-point attributes and/or classification. The selected polic(ies) may be transmitted to a client device associated with the user, for presentation thereon, and for acceptance by the user.

Referring back to FIG. 5, step 510 (also referred to as "Step 5") includes the network management device 404 determining the function and purpose of the end point device. In some embodiments, the inference may be based on a pre-defined machine-learned, or human-learned, classification from a set of databases of attributes and its corresponding functions and purpose. In some embodiments, the function or purpose are explicitly defined in a description field or as with Quality-of-Service provided through the end-point device or through the classification service. In some embodiments, the function and purpose of the end point device may be inferred by human operators that reviews the attributes and classification to provide an inferred function and purpose of the end point device. In the example provided in FIG. 4, the network management device 404 may determine that the ZigBee device 410a is a thermostat, e.g., based on attribute description of being a thermostat.

Referring still to FIG. 5, step 512 (also referred to as "Step 6) includes the network management device 404 determining the purpose and cost of the edge application (container-based or otherwise). In some embodiments, the purpose and cost of the edge application is determined from either or all of: (a) application registry/app store (b) an application manifest file as published by the app author, and/or (c) published material by the publisher and/or destination URIs.

Referring still to FIG. 5, step 514 (also referred to as "Step 7) includes the network management device 404 prioritizing, based on action performed from steps 510 and 512, the end point devices based on the criticality of the function/application, and the characteristics of the wireless technology.

In the example shown in FIG. 4, the network management device 404 may assign a priority value "1" to the BLE Heart Rate Monitor 410c, a priority value "2" to the BLE Wheelchair Tag 410b, and a priority value "3" to the ZigBee thermostat 410a. The assignment of the Heart Rate Monitor 410c may be based on the attribute description of the Heart Rate Monitor 410c being associated with life-critical application. The assignment of the BLE Wheelchair Tag 410b may be based on the attribute description of the Wheelchair Tag 410b being associated with a geofencing application. The assignment of the ZigBee thermostat 410a may be based on the attribute description of the ZigBee thermostat 410a being associated with a temperature control application.

Referring still to FIG. 5, step 516 (also referred to as "Step 8) includes the network management device 404 tagging wireless access points #1, #2, and #3 based on the proximity, or relative vicinity, of the end point devices to the wireless access points. From the use-case provided in FIG. 4, wireless access point #1 (402c) is tagged with BLE Heart Monitor (410c) and BLE Wheelchair (410b) because they each use BLE, and wireless access point #2 (402b) is tagged with the ZigBee thermostat (410a).

Referring still to FIG. 5, step 518 (also referred to as "Step 9) includes the network management device 404 pulling the pre-defined containerized applications based on the tags from an application registry/app store and deploying them on the selected wireless access points.

Indeed, based on the decision-making process outlined in FIGS. 5 and 6, the network management device 404 tags the wireless access points based on an assignment algorithm such as (a) a farthest-available-access-point-with-service-delivery-guarantee to end point devices (e.g., 410a-410c) or (b) a nearest-available-access-point-with-service-delivery-guarantee to the end point devices (e.g., 410a-410c). These algorithms and/or policies, among other disclosed herein, are merely illustrative and do not exclude other combinatorial approaches which provide the best QoS/QoE and the least cost for the customers for the end points and their respective applications.

Indeed, as illustrated in FIGS. 4-6, the network management device may select the wireless infrastructure and reconfigure the deployment of containerized application in wireless infrastructure, e.g., in a hospital environment, according to the following determination: (a) BLE-based Heart Monitor having the highest priority device (as a life-monitoring device) and hence wireless access point #1 is tagged for the monitor device and its related category; (b) BLE-based wheelchair being assigned the next highest priority and hence wireless access point #2 is tagged for the networked wheelchair and its related category; and (c) ZigBee-based thermostat (being a mesh protocol with low data rate and longer range is determined to be more resilient) is determined to be non-life critical and hence is tagged for wireless access point #3 which is shown to be located the furthest away from wireless access points #1 and #2 while still being able to bridge traffic to local or cloud-based building management system. Then, based on the tagging of the wireless access point, the network management device then pulls the appropriate applications (e.g., BLE Heart Monitoring and Alerting app on for wireless access point #1, Geofence Alerting app for wireless access point #2, and ZigBee radio application for wireless access point #3), for example, from an app registry to deploy on the respective wireless access points (e.g., #1, #2, and #3). The app registry, in some embodiments, are located on local storage on the network management device or on a remote server (in the network or cloud).

Indeed, the exemplary system and method, in some embodiments, beneficially facilitates the convergence of wireless network infrastructure with IOT end point devices using fragmented technologies and associated edge applications to autonomously and dynamically select wireless access points for the optimal, or near optimal, deployment of edge applications such that the customer gets the combination of the best Quality-of-Service (QoS) and/or Quality-of-Experience (QoE) for the IoT end point devices at the lowest possible cost.

Discussion

Traditionally, wireless access points have had native capabilities (e.g. Cisco AP 3600 or USB based modules from some of our competitors) to extend capabilities beyond Wi-Fi to other radio technologies such as Bluetooth, ZigBee, 3.5 GHz CBRS, etc. However, with reduction of cost of hardware and semiconductors over time, and the emergence of software-defined radio paradigms, many of these radio technologies are, and can continue to be, implemented natively into a wireless access point. With enhanced radio and CPU capabilities, wireless access points can now concurrently and simultaneously talk to multiple different wireless technologies such as Bluetooth, ZigBee, 3.5 GHz. CBRS, 900 MHz ISM, etc. With additions to supporting this rich portfolio of radios, wireless access points and other wireless infrastructure devices are also capable of hosting software containers (such as Cisco IOx or Docker) along with associated edge-computing application(s) (e.g., a Bluetooth or ZigBee radio application to bridge non-IP traffic, a local building automation/sensor management application, an application to provide real time location information for an indoor drone, etc.)

However, the aforementioned versatility of the wireless access point in being able to service non-WiFi wireless radios and edge computing applications also gives rise to challenges. Often time, these other wireless technologies are diverse—operating on different ranges (e.g., long/short), different data rates, different frequency of operation, and other associated characteristics. Further, some of these wireless technologies are configured in mesh topologies, e.g., to make the end points/devices more robust to coverage holes; Zigbee is an example of such mesh networks. Further, the end points being served by these radios may have different levels of priority in a business context. For example, logistics drone could have a higher priority than a wireless light bulb. In view of the aforementioned deployment diversity, it may not always make sense to deploy an associated container-based software application on every wireless access point, or like wireless infrastructure as discussed herein.

Rather, it may be detrimental to deploy a container-based application on every wireless access point. The enhanced CPU utilization by the containerized application may adversely impact the main function of a wireless access point in servicing WiFi clients. Further, such deployment may result in the unnecessary consumption of application licenses (e.g., if the hosted application has a per instance licensing model). Further, some of the Internet-of-Things (IoTs) system-on-a-chip(s) (SoC(s)) may be multi-protocol (e.g., having both BT and ZigBee capabilities); thus, deployment of both BT and Zigbee can be duplicative. Further, end point devices may be use-case specific such that they are confined to specific locations (e.g. HVAC/Thermostats are usually in one corner of a floor rather than uniformly spread). Further, end point devices may be mobile and subject to roaming and thus a static selection of wireless access points, and like wireless infrastructure, for application deployment may not be suitable or could result in subpar configuration. Further, in a resource constrained environment, it may not be possible to run multiple and unlimited applications on any one wireless access point without compromising the underlying core functionality of the device.

With the manual selection of one or more wireless access point for the deployment of container-based application(s), there will likely be a suboptimal choice of the number and location of wireless access points, leading to subpar outcomes for the customer and in many cases, the network. Further, the operational teams may not be aware of the minutiae of the wireless radio technology to properly configure the network—again, leading to potential subpar customer/business outcomes.

The coverage-assessment network device and access point devices may be implemented in general-purpose or special purpose computing devices environments, virtual network environment, or configurations. Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

An exemplary system for implementing aspects described herein includes a computing device, such as computing device. In its most basic configuration, computing device typically includes at least one processing unit and memory. Depending on the exact configuration and type of computing device, memory may be volatile (such as random access memory (RAM)), non-volatile (such as read-only memory (ROM), flash memory, etc.), or some combination of the two.

Computing device typically includes a variety of computer readable media. Computer readable media can be any available media that can be accessed by the device and includes both volatile and non-volatile media, removable and non-removable media.

Computer storage media include volatile and non-volatile, and removable and non-removable media implemented in any method or technology for storage of information such as computer readable instructions, data structures, program modules or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device. Any such computer storage media may be part of computing device.

Computing device may contain communication connection(s) that allow the device to communicate with other devices. Computing device may also have input device(s) such as a keyboard, mouse, pen, voice input device, touch input device, etc. Output device(s) such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents.

What is claimed is:

1. A system comprising:
   a processor; and
   a memory having instructions stored thereon, wherein execution of the instructions by the processor, cause the processor to:
   in a network, obtain one or more end-point and access-point information associated with one or more endpoint computing devices connected to a plurality of access points, wherein at least one of the one or more end-point information includes an identifier associated with an end-point function of each end-point computing device;

obtain, from the network, one or more policies each associated with deployment of containerized applications at access points in the network;

select a first access point of the plurality of access points based on a policy of the one or more policies to execute a containerized application deployment of a plurality of containerized application deployments, wherein the selection comprises a match of criteria of the policy to at least the end-point function, wherein the containerized application deployment comprises one or more gateway interfaces and one or more associated edge computing gateway applications to interface with a plurality of end-point computing devices based on the obtained one or more end-point information;

direct the first access point to execute the containerized application deployment to provide access in the network for the one or more end-point computing devices;

select a second access point of the plurality of access points based on the policy to execute the containerized application deployment, wherein the selection comprises a match of criteria of the policy to at least the end-point function;

direct the second access point to execute the containerized application deployment to provide access in the network for the one or more end-point computing devices; and direct the first access point to remove the containerized application deployment.

2. The system of claim 1, wherein the one or more policies are received from an external classification service or a storage area network, and wherein the external classification service comprises an identity service engine configured to provide an identity identifier for end-point computing devices in the network.

3. The system of claim 1, wherein the one or more policies associated with the deployment of containerized application deployment at the access points in the network comprises:
computer-readable instructions to retrieve the containerized application deployment.

4. The system of claim 1, wherein the one or more policies includes a policy having instructions to select an access point of the plurality of access points based on proximity of the access point to the one or more end-point computing devices.

5. The system of claim 1, wherein the one or more policies include a policy comprising:
instructions to determine a relative location value associated with each end-point computing device to the plurality of access points;
instructions to obtain a protocol characteristic value of the end-point computing devices;
instructions to determine a function or QOS value associated with the one or more end-point computing devices; and
instructions to determine a cost value for execution of the containerized application deployment at the plurality of access points, or a portion thereof, wherein the determined cost value(s) are also used to select the first access point to execute the containerized application deployment.

6. The system of claim 5, wherein the instructions to determine the function or QOS value associated with the end-point computing devices comprises:
instructions to retrieve, from a device classifier device, a high-fidelity classification of the respective end-point computing device.

7. The system of claim 5, wherein the instructions to determine the relative location value associated with the end-point computing device comprises:
instructions to obtain RSSI information from a respective end-point computing device and from the plurality of end-point computing devices, or a portion thereof;
instructions to triangulate a location value of the respective end-point computing device; and
instructions to determine the relative location value of the respective end-point computing device to one or more of the plurality of access points based on the triangulated location value of the respective end-point computing device and on the location values of the plurality of endpoint computing devices, or the portion thereof.

8. The system of claim 5, wherein the obtained protocol characteristic value is obtained from a database device, and wherein the protocol characteristic value comprises at least one value set selected from the group consisting of an average communication range value set, a signal power value set, a multi-path signal characteristic value set, a signal attenuation characteristic value set, a data rate value set, a mesh network value set, a reliable network value set, and a battery cost function value set.

9. The system of claim 1, wherein the policy is selected from the group consisting of:
a policy configured to provide a best-effort-delivery-guarantee-to-destination operation;
a policy configured to provide a best-latency-to-destination operation;
a policy configured to provide a lowest-battery-usage operation;
a policy configured to provide a farthest-access-point-with-service-guarantee operation; and
a policy configured to provide a nearest-access-point-with-service-guarantee operation.

10. The system of claim 9, wherein the instructions to execute the policy configured to provide the best-effort-delivery-guarantee-to-destination operation comprises:
one or more instructions, wherein execution of the one or more instructions by said processor, cause the processor to:
determine a QoS guarantee value for each of the plurality of access points to generate a list of QoS guarantees for the plurality of access points, or a portion thereof; and
select a highest, or next highest value, from the sorted list.

11. The system of claim 9, wherein the instructions to execute the policy configured to provide the best-latency-to-destination operation comprises:
one or more instructions, wherein execution of the one or more instructions by said processor, cause the processor to:
determine an associated latency value each of the plurality of access points to transmit hypothetical packets, test packets, or prior packets, to a specified destination device to generate a list of associated latency values for the plurality of access points, or a portion thereof; and select at least one of a lowest, next lowest value, and best ranking score based on latency values, from the sorted list.

12. The system of claim 9, wherein the instructions to execute the policy configured to provide the lowest-battery-usage operation comprises:
one or more instructions, wherein execution of the one or more instructions by said processor, cause the processor to:
determine an associated battery usage value to execute the function by the end-point computing device with each of the plurality of access points, or a portion thereof, to generate a list of associated battery usage; and
select at least one of a lowest, next lowest value, and best ranking score based on associated battery usage values from the sorted list.

13. The system of claim 9, wherein the instructions to execute the policy configured to provide the farthest-access-point-with-service-guarantee operation comprises:
one or more instructions, wherein execution of the one or more instructions by said processor, cause the processor to:
determine a proximity or location value for each of the plurality of access points, or a portion thereof, that meets a minimum pre-defined QoS value to generate a list of plurality of access points; and
select at least one of a lowest, next lowest value, and best ranking score based on the proximity or location value.

14. The system of claim 9, wherein the instructions to execute the policy configured to provide the nearest-access-point-with-service-guarantee operation comprises:
one or more instructions, wherein execution of the one or more instructions by said processor, cause the processor to:
determine a proximity or location value for each of the plurality of access points, or a portion thereof, that meets a minimum pre-defined QoS value to generate a list of plurality of access points; and
select at least one of a lowest, next lowest value, and best ranking score based on the proximity or location value.

15. The system of claim 1, wherein the selected access point is configured to execute the containerized application deployment by:
obtaining one or more applications from a database device; and
executing the one or more applications.

16. The system of claim 1, wherein the system comprises at least one of an external software controller, a manager executing on the software controller, and a manager executing on an access point.

17. The system of claim 1, wherein the end-point function has an associated quality-of-service value and/or an associated wireless technology protocol or gateway.

18. The system of claim 1, wherein the instructions, when executed by the processor, further cause the processor to:
obtain one or more end-point information associated with a first and a second end-point computing device, wherein at least one of the one or more end-point information associated with the first and second end-point computing device includes an identifier associated with an end-point function of the first and second end-point computing device.

19. A non-transitory computer readable medium comprising instructions, wherein execution of the instructions by a processor, cause the processor to:
in a network, obtain one or more end-point and access-point information associated with one or more end-point computing devices connected to a plurality of access points, wherein at least one of the one or more end-point information includes an identifier associated with an end-point function of each end-point computing device;
obtain, from the network, one or more policies each associated with deployment of containerized applications at access points in the network;
select a first access point of the plurality of access points based on a policy of the one or more policies to execute a containerized application deployment of a plurality of containerized application deployments, wherein the selection comprises a match of criteria of the policy to at least the end-point function, wherein the containerized application deployment comprises one or more gateway interfaces and one or more associated edge computing gateway applications to interface with a plurality of end-point computing devices based on the obtained one or more end-point information;
direct the first access point to execute the containerized application deployment to provide access in the network for the one or more end-point computing devices;
select a second access point of the plurality of access points based on the policy to execute the containerized application deployment, wherein the selection comprises a match of criteria of the policy to at least the end-point function;
direct the second access point to execute the containerized application deployment to provide access in the network for the one or more end-point computing devices; and
direct the first access point to remove the containerized application deployment.

20. A method comprising:
in a network, obtaining, by a processor, one or more end-point and access-point information associated with one or more end-point computing devices connected to a plurality of access points, wherein at least one of the one or more end-point information includes an identifier associated with an end-point function of each end-point computing device;
obtaining, by the processor, one or more policies each associated with deployment of containerized applications at access points in the network from the network;
selecting, by the processor, a first access point of the plurality of access points based on a policy of the one or more policies to execute a containerized application deployment of a plurality of containerized application deployment, wherein the selection comprises a match of criteria of the policy to at least the end-point function, wherein the containerized application deployment comprises one or more gateway interfaces and one or more associated edge computing gateway applications to interface with a plurality of end-point computing devices based on the obtained one or more end-point information;
direct, by the processor, the first access point to execute the containerized application deployment to provide access in the network for the one or more end-point computing devices;
selecting, by the processor, a second access point of the plurality of access points based on the policy to execute the containerized application deployment, wherein the selection comprises a match of criteria of the policy to at least the end-point function;

direct, by the processor, the second access point to execute the containerized application deployment to provide access in the network for the one or more end-point computing devices; and direct, by the processor, the first access point to remove the containerized application deployment.

\* \* \* \* \*